(12) United States Patent
Araya

(10) Patent No.: US 6,413,493 B1
(45) Date of Patent: *Jul. 2, 2002

(54) PROCESS FOR PRODUCING P ZEOLITE

(75) Inventor: Abraham Araya, Wirral (GB)

(73) Assignee: Unilever Patent Holdings B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/288,313

(22) Filed: Aug. 10, 1994

Related U.S. Application Data

(63) Continuation of application No. 08/046,864, filed on Apr. 8, 1993, now Pat. No. 5,362,466.

(30) Foreign Application Priority Data

Apr. 9, 1992 (EP) ............................................. 92303147

(51) Int. Cl.$^7$ .......................... C01B 39/02; C01B 39/46
(52) U.S. Cl. .................... 423/709; 423/710; 423/328.1; 423/332; 423/333; 423/334; 502/64
(58) Field of Search ............................. 423/328–1, 332, 423/333, 334, 709, 710; 502/64

(56) References Cited

U.S. PATENT DOCUMENTS

| | | | | |
|---|---|---|---|---|
| 3,532,459 A | | 10/1970 | McEvoy et al. | 23/112 |
| 3,947,482 A | | 3/1976 | Albers et al. | 260/448 |
| 4,166,099 A | | 8/1979 | McDaniel et al. | 423/329 |
| 4,178,352 A | | 12/1979 | Vaughan et al. | 423/329 |
| 4,330,518 A | | 5/1982 | Kostinko | 423/329 |
| 4,385,042 A | | 5/1983 | Whitehurst et al. | 423/329 |
| 5,340,563 A | * | 8/1994 | Zones et al. | 502/64 |
| 5,362,466 A | * | 11/1994 | Araya | 423/328.1 |
| 5,397,561 A | * | 3/1995 | Smith | 502/64 |

FOREIGN PATENT DOCUMENTS

| | | |
|---|---|---|
| DE | 2026401 | 12/1970 |
| EP | 0384070 | 8/1990 |

* cited by examiner

*Primary Examiner*—Walter D. Griffin
(74) *Attorney, Agent, or Firm*—Pillsbury Winthrop LLP

(57) ABSTRACT

The invention describes a process for preparing P zeolites in which aluminate and silicate solutions are reacted in the presence of a P-zeolite seed.

9 Claims, No Drawings

PROCESS FOR PRODUCING P ZEOLITE

This is a continuation of application Ser. No. 08/046,864, filed Apr. 8, 1993, now U.S. Pat. No. 5,362,446.

FIELD OF THE INVENTION

The invention describes the preparation of alkali metal aluminosilicates, in particular crystalline aluminosilicates having the P-structure. These materials are of value as a component in detergent formulations in which they remove calcium and magnesium hardness ions by ion exchange. They also have other properties which provide additional benefits when used in detergent formulations. These aluminosilicates will be referred to as zeolite P in this description.

BACKGROUND OF THE INVENTION

While the utility of zeolite P in detergent formulations has been acknowledged, for example in European Patent Application 0384070 (Unilever), they must be manufactured by a commercially effective process in order to become available on the market place. Thus, while the properties of a material may make it a useful commercial commodity, its manufacture has to be optimised for large scale production.

The zeolite P class includes a series of synthetic zeolite phases which may be in cubic configuration (also termed B or $P_c$) or tetragonal configuration (also termed $P_1$) but is not limited to these forms. The structure and characteristics of the zeolite P class are given in "Zeolite Molecular Sieves" of Donald W Breck (published 1974 and 1984 by Robert E Krieger of Fla. USA). The zeolite P class has the typical oxide formula:

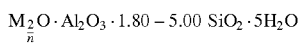

The present invention provides a process for preparing crystalline P-zeolites having Si:Al ratios from 0.9 to 1.33, which are particularly effective as detergent builders, preferably ratios of 1.15:1 and below and more preferably 1.07:1 and below.

M is an n-valent cation which for this invention is an alkali-metal, that is lithium, potassium, sodium, caesium or rubidium with sodium and potassium being preferred and sodium being the cation normally used in commercial processes.

Thus sodium may be present as the major cation with another alkali metal present in a minor proportion to provide a specific benefit.

The process of the present invention allows the production of P-zeolite with the above defined ratios at economic yield. During the formation of the crystalline zeolite the reacted medium passes through a gel stage. A preferred embodiment of the invention is the production of P-zeolites at a silicon:aluminium molar ratio of 1.00±0.05 from a synthesis gel with the same compositional ratio.

This feature results in the desired product and a filtrate liquor containing essentially only sodium hydroxide. This liquor can be recirculated, after optional concentration, e.g. by evaporation, to the preparation of the initial reactant solutions. Another advantage of producing P-zeolites from a synthesis gel with the same silicon:aliminium ratio is that all the sodium silicate and the sodium aluminate are used thus optimising the consumption of the starting material.

Moreover, for detergents applications there is a need for a product with high oil absorption.

GENERAL DESCRIPTION OF THE INVENTION

It is a first object of the present invention to provide a process for the preparation of P zeolite having the oxide formula

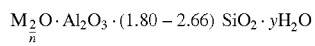

wherein y is the water content,
i. a sodium aluminate solution at a temperature of at least 25° C. is mixed with a sodium silicate solution and a temperature of at least 25° C. in an adequately vigorously stirred vessel in the presence of an effective amount of a slurry of P zeolite seed to form a gel having the composition,
$Al_2O_3$: (1.00–3.5)$SiO_2$: (1.2–7.5)$Na_3O$.
(25 to 450) (preferably 40 to 150) $H_2O$
ii. ageing the gel at a temperature above about 25° C. with adequate vigorous stirring to maintain solids in suspension for a period of at least about 0.1 hours, and
iii. separating the P zeolite product, washing and drying.

The product is washed in order to remove excess electrolytes such as caustic.

The sources of the seed zeolite P is not critical, although preferably it is added to the reactants as a previously prepared slurry. Alternatively a crystallised slurry from a previous reaction may be used. Additionally the ratio of the P-zeolite seed is not critical and a P-zeolite having a Si:Al ratio above 1.33 can be used.

That is to say the seed crystalline form drives the reaction to the P-form and the product ratio is attained from the gel ratio of the reactants. The processes of the invention can be operated at the scale required for commercial activities.

The ratios and concentrations of the aluminates and silicates used are not critical, but must be known to allow calculation of the gel and product compositions. The temperatures used will usually be well above the minimum temperature of 25° C. and are preferably above about 60° C. The gel composition will preferably contain about 40 to 150 moles of water per mole alumina.

The range of the silicon:aluminium ratio of the gel is wider than the corresponding ratio of the product since the silicon:aluminium ratio of the product is always between 2 and the corresponding ratio of the gel.

The period for ageing the gel to form the product zeolite is dependent on composition and temperature and will preferably be complete in about 10 hours, although the process will more preferably be completed within 5 hours for a commercial process.

Since it is particularly advantageous to produce P-zeolites at a silicon:aluminium molar ratio of 1.00±0.05 from a synthesis gel with the same compositional ratio, it is a second object of the present invention to provide a process for the preparation of P zeolite having the oxide formula

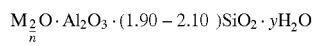

wherein y is the water content, comprising the steps of:
i. a sodium aluminate solution having a temperature of at least 60° C. is mixed with a sodium silicate solution at a temperature of at least 60° C. in a stirred vessel in the presence of an effective amount of a slurry of P zeolite seed to form a gel having the composition,
$Al_2O_3$:(1.80–2.2)$SiO_2$:(1.5–5)$Na_2O$: (40 to 150) $H_2O$
ii. ageing the gel at a temperature above about 60° C. with stirring to maintain solids in suspension for a period of least about 0.1 hour, and iii. separating the P zeolite product, washing and drying.

The process described is a particularly favourable route for preparing P zeolites having improved properties for use as detergent builders. These P zeolites have effective binding capacities for calcium of above 150, preferably above 160 mg/g, good rate of calcium uptake i.e. below 25 seconds, preferably below 10 secs and effective oil absorption i.e. at least 50 g/100 g zeolite and in the range to 100 g/100 g zeolite. Their $d_{50}$ was in the range of about 0.85 to about 2.00 micron and was therefore particularly suitable as detergent builders.

It is therefore a third object of the present invention to provide a P zeolite having the oxide formula

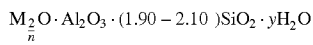

wherein y is the water content
and having a calcium effective binding capacity of above 150 mg/g, an oil absorption of above 80 g of oil per 100 g of zeolite and a calcium uptake rate of below 10 seconds.

Standard Procedures

In the characterisation of the zeolite-P materials prepared by the present process the following methods were used.

i. Particle size: The average particle size (microns) was measured by a Malvern Mastersizer (Trade Mark) obtainable from Malvern Instruments, England and expressed as the $d_{50}$, i.e. 50% by weight of the particles have a diameter smaller than the diameter quoted. The definitions $d_{80}$ and $d_{90}$ may also be used in association with the appropriate figure. Prior to measuring the particle size, the sample is dried as a thin layer (about 1.5 mm) at 110° C. for two hours in a fan oven.

ii. Calcium uptake rate (CUR): The rate of removal of $Ca^{++}$ ions from a wash liquor is an important characteristic of a detergency builder. The time, in seconds, is determined for a zeolite, at a concentration of 1.48 $gdm^{-3}$ and a temperature of 25° C., to reduce the calcium ion concentration in a 0.01M sodium chloride solution from an initial value of $2 \times 10^{-3}$ M to $10^{-5}$ M. The zeolite was first equilibrated to constant weight over saturated sodium chloride solution and the water content measured.

iii. Calcium effective binding capacity (CEBC): The CEBC was measured in the presence of a background electrolyte to provide a realistic indicator of calcium ion uptake in a wash liquor environment. A sample of each zeolite was first equilibrated to, constant weight over saturated sodium chloride solution and the water content measured. Each equilibrated sample was dispersed in water (1cm³) in an amount corresponding to 1 g dm⁻³ (dry), and the resulting dispersion (1 cm³) was injected into a stirred solution, consisting of 0.01M NaCl solution (50 cm³) and 0.05M $CaCl_2$ (3.923 cm³), therefore producing a solution of total volume 54.923 cm³. This corresponded to a concentration of 200 mg CaO per litre, i.e. just greater than the theoretical maximum amount (197 mg) that can be taken up by a zeolite of Si:Al ratio 1.00. The change in $Ca^{2+}$ ion concentration was measured by using a $Ca^{2+}$ ion selective electrode, the final reading being taken after 15 minutes. The temperature was maintained at 25° C. throughout. The $Ca^{2+}$ ion concentration measured was subtracted from the initial concentration, to give the effective calcium binding capacity of the zeolite sample as mg CaO/g zeolite.

iv. Oil absorption: This was determined by the ASTM spatula rub-out method (American of Test Material Standards D281). The test is based on the principle of mixing linseed oil with the particulate zeolite by rubbing with a spatula on a smooth surface until a stiff putty like paste is formed which will not break or separate when it is cut with the spatula. The weight of oil used is then put into the equation:

$$\text{Oil absorption } (OA) = \frac{\text{g oil absorbed} \times 100}{\text{wt. of zeolite (gms)}}$$

$$= \text{g oil}/100\text{g zeolite}$$

In order to measure the oil absorption of the product, the washed filter cakes obtained after crystallisation were merely dried at; room temperature as a thin layer of about 2 mm until a solids content of at least 78% by weight was achieved, normally it was achieved in 2–3 days.

v. The form of the zeolite which was produced was established using standard XRD method.

Specific Description of the Invention

Examples of processes of the invention will now be given to illustrate but not limit the invention.

Seed preparation

A Sample of zeolite P was produced using the following procedure to be used as seed in the subsequent examples.

1420 g of 2M sodium hydroxide solution and 445 g of commercial sodium aluminate solution (concentration 20% $Na_2O$, 20% $Al_2O_3$) ($Na_2O/Al_2O_3$=1.64) were placed in a 5 litre baffled flask connected to a reflux condenser.

The resultant solution was stirred and heated to 90° C. 450 g of commercial sodium silicate solution (($SiO_2$ 28.3%/ 13.8% $Na_2O$ w/w) $SiO_2/Na_2O$=2:1) was diluted with 1100 g of deionised water. The diluted. silicate solution was heated to 75° C. and added to the stirred aluminate caustic solution over 18 minutes. The resultant reaction mixture gel was allowed to react at 90° C. with stirring for 5 hours. The product was filtered, washed and dried.

EXAMPLE 1

Solutions A, B and C were prepared.

Solution A—1000 g of 2M sodium hydroxide solution.

Solution B—490 g of commercial sodium silicate solution as used in the seed preparation 300 g of 4M sodium hydroxide solution 20 g of P zeolite seed slurried in 30 g deionised water.

Solution C—588 g of commercial sodium aluminate solution as used in the seed preparation. 300 g of 4M sodium hydroxide solution.

Solution A was placed in a 5 litre round bottomed baffled flask with pitch blade turbine (500rpm) having a reflux condenser and heated to 90° C. with vigorous stirring. Solution B and solution C were first preheated to 75° C. and added simultaneously to solution A with solution B beginning 30 seconds before solution C, over 18 minutes and 37 minutes, respectively. The reaction gel mixture was allowed to react at 90° C. with stirring for 5 hours. The product was filtered, washed and dried.

EXAMPLE 2 (comparative)

The procedure of Example 1 was repeated with the omission of the P zeolite seed slurry.

EXAMPLE 3

The procedure of Example 1 was repeated using a 2m³ vessel with suitable increased quantities of reactants. The vessel had a diameter of 1.13m and 2m height. The vessel had two stirrers. The bottom stirrer was a flat blade impeller and the middle stirrer was a pitch blade impeller (120 rpm with both stirrers on a single shaft).

EXAMPLE 4

The procedure of Example 1 was repeated using a 20m³ vessel with a bottom flat bladed disc turbine stirrer (100 rpm) with the following increased quantities of reactants.

Solution A—2,553 kg of 2M sodium hydroxide solution

Solution B—3,724 kg of sodium silicate solution (conc. $SiO_2$ 14.7%. $Na_2O$ 12.3%)

Solution C—4,355 kg of sodium aluminate solution (conc. $Na_2O$ 16.11%. $Al_2O_3$ 10.7%)

Solution D—75 kg of P zeolite seed in 125 kg water.

The procedure of Example 1 was followed with solution D being added with solution B over 18 minutes.

EXAMPLE 5

Solutions A, B and C were prepared.

Solution A—648 g of 2M sodium hydroxide solution

Solution B—952 g of commercial sodium silicate solution as used in the seed reaction —470 g of 2M sodium hydroxide solution —20 g of P zeolite seed slurried in 30 g deionised water Solution C—1139.5g of commercial sodium aluminate (20% $Na_2O$, 20% $Al_2O_3$)

—805 g of 2M NaOH solution

Solution A was placed in a 5 litre round bottomed baffled flask and heated to 90° C. with stirring using the turbine of Example 1. Solution B and solution C were first preheated to 80° C. and added, beginning simultaneously, to solution A over 20 minutes and 40 minutes respectively. The reaction gel was allowed to react at 90° C. with stirring for 5 hours. The product was filtered, washed and dried.

EXAMPLE 6 (COMPARATIVE)

The procedure of example 5 was repeated with the omission of the P zeolite seed slurry.

The properties of these zeolite products are given in Table I.

EXAMPLE 7

The procedure of Example 5 was repeated with the level of seed reduced by half (i.e. 10 g of P zeolite, instead of 20 g, was used in solution B).

EXAMPLE 8

The procedure of Example 5 was repeated with 65 g of the crystallised slurry obtained in Example 5 used as seed.

EXAMPLE 9

The procedure of Example 5 was repeated with 30 g of the washed filter cake of Example 5 used as seed.

EXAMPLE 10

The procedure of Example 5 was repeated with 15 g of the dried filter cake of Example 5 used as seed.

Examples 8, 9 and 10 prove that the origin of the seed is of no importance.

EXAMPLE 11

The procedure of Example 5 was repeated using a 20 m³ vessel with a proportional increase in quantities of reactants.

EXAMPLE 12

The procedure of Example 8 was repeated using a 20 m³ vessel with a proportional increase in quantities of reactants.

EXAMPLE 13

The procedure of Example 9 was repeated using a 20 m³ vessel with a proportional increase in quantities of reactants.

EXAMPLE 14

The procedure of Example 10 was repeated using a 20 m³ vessel with a proportional increase in quantities of reactants.

Examples 4 and 11 to 14 prove that the process of the invention can be run at an industrial scale. That means that even with a very sensitive gel composition, most favorable for the production of zeolite A, it is nevertheless completely possible, with the process according to the present invention, to produce zeolite P at an industrial scale in a vessel of 20 m³.

Another advantage of the present invention is therefore to enable the production of zeolite P using gel compositions and factory installations normally used for the production of zeolite A.

EXAMPLE 15

The procedure of Example 5 was repeated with the reaction mixture (after reaching the crystallisation temperature of 90° C.) allowed to react for:

a—30 minutes b—60 minutes c—180 minutes

Example 15 proves that crystallisation time is not a critical parameter if kept above 0.1 hour.

EXAMPLE 16

The procedure of Example 5 was repeated with the temperature of the reactant components as well as the crystallisation temperature reduced to 60° C.

Zeolite P was produced together with a small amount of zeolite A proving that, for the most sensitive gel composition wherein the silicon:aluminium ratio is equal to 1, a temperature of about 60° C. is actually the minimum for producing zeolite P. In order to have a pure P zeolite product, without any zeolite A, a crystallisation temperature of at least 80° C. has been found necessary for such a gel composition and, in order to minimize the crystallisation time, the temperature has to be preferably above 85° C.

EXAMPLE 17

The procedure of example 11 was first repeated.

After the completion of crystallisation, filtration and washing of product, the resultant mother liquor and wash water solution was collected.

Part of the collected dilute mother liquor solution, which is essentialy a dilute alkaline solution containing 8.7% $Na_2O$, was concentrated by evaporation up to 21% $Na_2O$ and used to dissolve aluminium trihydrate. The concentrated sodium aluminate thus produced was diluted with some of the dilute mother liquor to give a sodium aluminate solution with the same concentration as that of solution C given in Example 5.

Part of the remaining dilute mother liquor was also used to dilute concentrated commercial sodium silicate solution to produce a sodium silicate solution having the same concentration as that of solution B given in Example 5.

The rest of the remaining dilute mother liquor played the same role as that of solution A given in Example 5.

The procedure of Example 11 was repeated using the solutions (A, B and C) prepared with the recycled mother liquor.

A product was obtained having the same characteristics as those of the product disclosed in Example 11 proving that it is completely possible to recycle the mother liquor.

Finally when comparing the oil absorption of the zeolites obtained according to the process of the present invention with the oil absorption of the comparative Examples or the oil absorption of the seed, it is immediately obvious that the oil absorption of a zeolite obtained according to the present invention is significantly higher.

TABLE I

Zeolite Properties

|  | Seed | Ex 1 | Ex 2 * | Ex 3 | Ex 4 |
|---|---|---|---|---|---|
| $SiO_2/Al_2O_3$ (gel) | 2.50 | 2.00 | 2.00 | 2.00 | 2.00 |
| $SiO_2/Al_2O_3$ (product) | 2.15 | 2.00 | 2.00 | 2.00 | 2.00 |
| Yield % On Dry Basis | 7.4 | 12.3 | 12.3 | 12.3 | 12.3 |
| Zeolite | P | P | A + Hydroxy Sodalite (Trace) | P | P |
| APS (micron) $d_{50}$ | 0.90 | 0.94 | 5.0 | 0.90 | 0.90 |
| CUR (secs) | 8 | 4 | >200 | 6 | 5 |
| CEBC (mg/g) | 159 | 168 | 120 | 165 | 166 |
| Oil Absorption (g oil/100 g zeolite) | 70 | 88 | 52 | 85 | 84 |

|  | Ex 5 | Ex 6 * | Ex 7 | Ex 8 | Ex 9 |
|---|---|---|---|---|---|
| $SiO_2/Al_2O_3$ (gel) | 2 | 2 | 2 | 2 | 2 |
| $SiO_2/Al_2O_3$ (product) | 2 | 2 | 2 | 2 | 2 |
| Yield % On Dry Basis | 16.0 | 16.00 |  |  |  |
| Zeolite Type | P | A | P | P | P |
| APS (micron) $d_{50}$ | 0.95 | 7 | 0.90 | 0.95 | 0.88 |
| CUR (secs) | 4 | >200 | 5 | 6 | 7 |
| CEBC (mg/g) | 167 | 120 | 165 | 164 | 163 |
| Oil Absorption (g oil/100 g zeolite) | 94 | 53 | 90 | 91 | 93 |

|  | Ex 10 | Ex 11 | Ex 12 | Ex 13 | Ex 14 |
|---|---|---|---|---|---|
| $SiO_2/Al_2O_3$ (gel) | 2 | 2 | 2 | 2 | 2 |
| $SiO_2/Al_2O_3$ (product) | 2 | 2 | 2 | 2 | 2 |
| Zeolite Type | P | P | P | P | P |
| APS (micron) $d_{50}$ | 0.85 | 0.96 | 0.90 | 0.93 | 0.94 |
| CUR (secs) | 8 | 6 | 5 | 7 | 6 |
| CEBC (mg/g) | 166 | 163 | 165 | 167 | 164 |
| Oil Absorption (g oil/100 g zeolite) | 90 | 94 | 93 | 92 | 91 |

|  | Ex 15a | Ex 15b | Ex 51c | Ex 17 |
|---|---|---|---|---|
| $SiO_2/Al_2O_3$ (gel) | 2 | 2 | 2 | 2 |
| $SiO_2/Al_2O_3$ (product) | 2 | 2 | 2 | 2 |
| Zeolite Type | P | P | P | P |
| APS (micron) $d_{50}$ | 1.5 | 1.1 | 0.95 | 0.95 |
| CUR (secs) | 7 | 5 | 6 | 7 |
| CEBC (mg/g) | 165 | 166 | 165 | 163 |
| Oil Absorption (g oil/100 g zeolite) | 89 | 90 | 92 | 90 |

* comparative examples
These results demonstrate the process of the invention provides product zeolites having satisfactory properties. In the absence of the P-zeolite seed the product consisted of A zeolite as the sole or major product.

What is claimed is:

1. A process for the industrial scale preparation of pure P zeolite without any zeolite A and having the oxide formula $$M_{2/n}O \cdot Al_2O_3 \cdot (1.90–2.10)SiO_2 \cdot yH_2O$$

wherein M is an n-valent alkali metal cation and y is the water content, comprising the steps of:

i) mixing a sodium aluminate solution having a temperature of at least 60° C. with a sodium silicate solution at a temperature of at least 60° C. in a stirred vessel of 2 m³ volume or more, in the presence of a slurry of P zeolite seed to form a gel having the composition, $$Al_2O_3:(1.80–2.2)SiO_2:(1.5–5)Na_2O:(40 \text{ to } 150)H_2O$$

ii) aging the gel at a temperature of at least 80° C. with stirring to maintain solids in suspension for a period of at least about 0.1 hour; and iii) separating the P zeolite product, washing the separated P zeolite product and drying the same.

2. A process according to claim 1, wherein i) a first amount of the sodium aluminate solution and an amount of sodium silicate solution are simultaneously added to the stirred vessel at a temperature of at least 60° C.;

ii) subsequently a second amount of sodium aluminate solution is added to the mixture formed in step i), the first and second amounts of sodium aluminate solution and the amount of sodium silicate solution being such as to produce a gel having the composition;

$$Al_2O_3:(1.80–2.2)SiO_2:(1.5–5)Na_2O:(40 \text{ to } 150)H_2O$$

and the total time taken to add the first and second amounts of sodium aluminate solution is between 1.5 and 2.5 times the time taken to add the sodium silicate solution iii) aging the gel at a temperature above 80° C. with stirring to maintain solids in suspension for a period of at least about 0.1 hour; and iv) separating the P zeolite product, washing the separated P zeolite product and drying the same.

3. A process according to claim 2, wherein the total time taken to add the first and second amounts of sodium aluminate solution is approximately 2 times the time taken to add the sodium silicate solution.

4. A process according to claim 2 wherein the sodium silicate solution is added over a period of about 20 minutes and the sodium aluminate is added over a total period of about 40 minutes.

5. A process according to claim 1, wherein the addition of sodium aluminate solution is started at least 30 seconds after the addition of sodium silicate solution is started.

6. A process according to claim 1, wherein the slurry of P type zeolite seed is added with the sodium silicate solution.

7. A process according to claim 1, wherein the gel has the composition $$Al_2O_3:(1.80–2.2)SiO_2:(1.5–5)Na_2O:(40–75)H_2O.$$

8. A process according to claim 1, further comprising recovering a portion of the P zeolite product in the form of a slurry and repeating steps i), ii) and iii) using said slurry as the slurry of P zeolite seeds in step i).

9. A process according to claim 8, wherein the portion of the P zeolite product is in the form of a crystallized slurry.

* * * * *